United States Patent Office 3,504,811
Patented Apr. 7, 1970

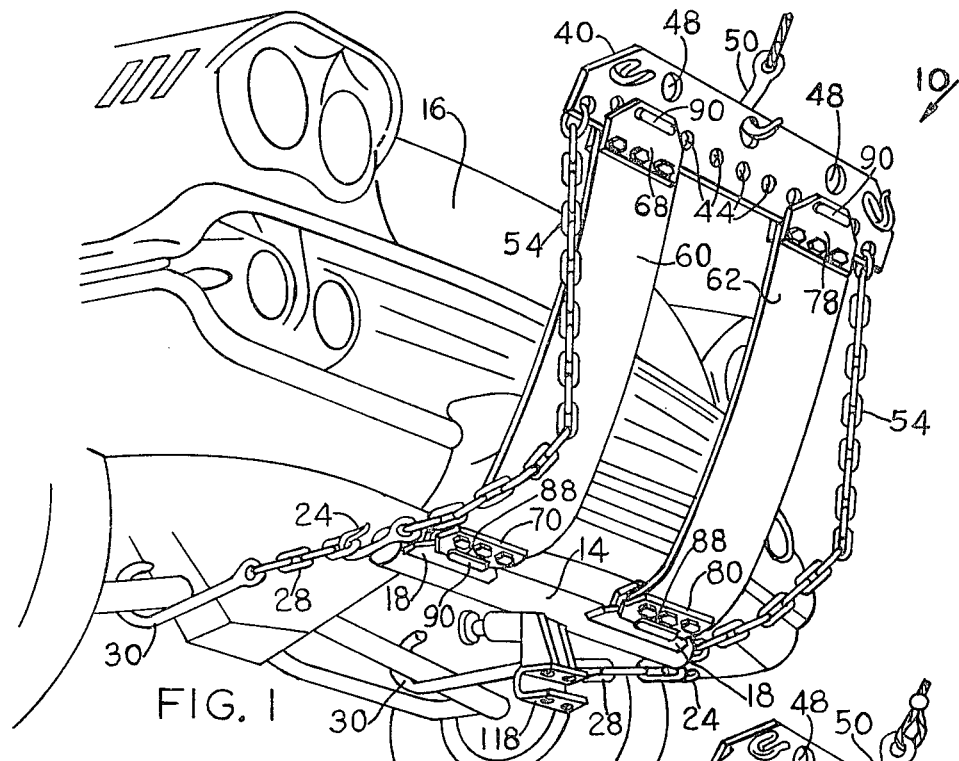

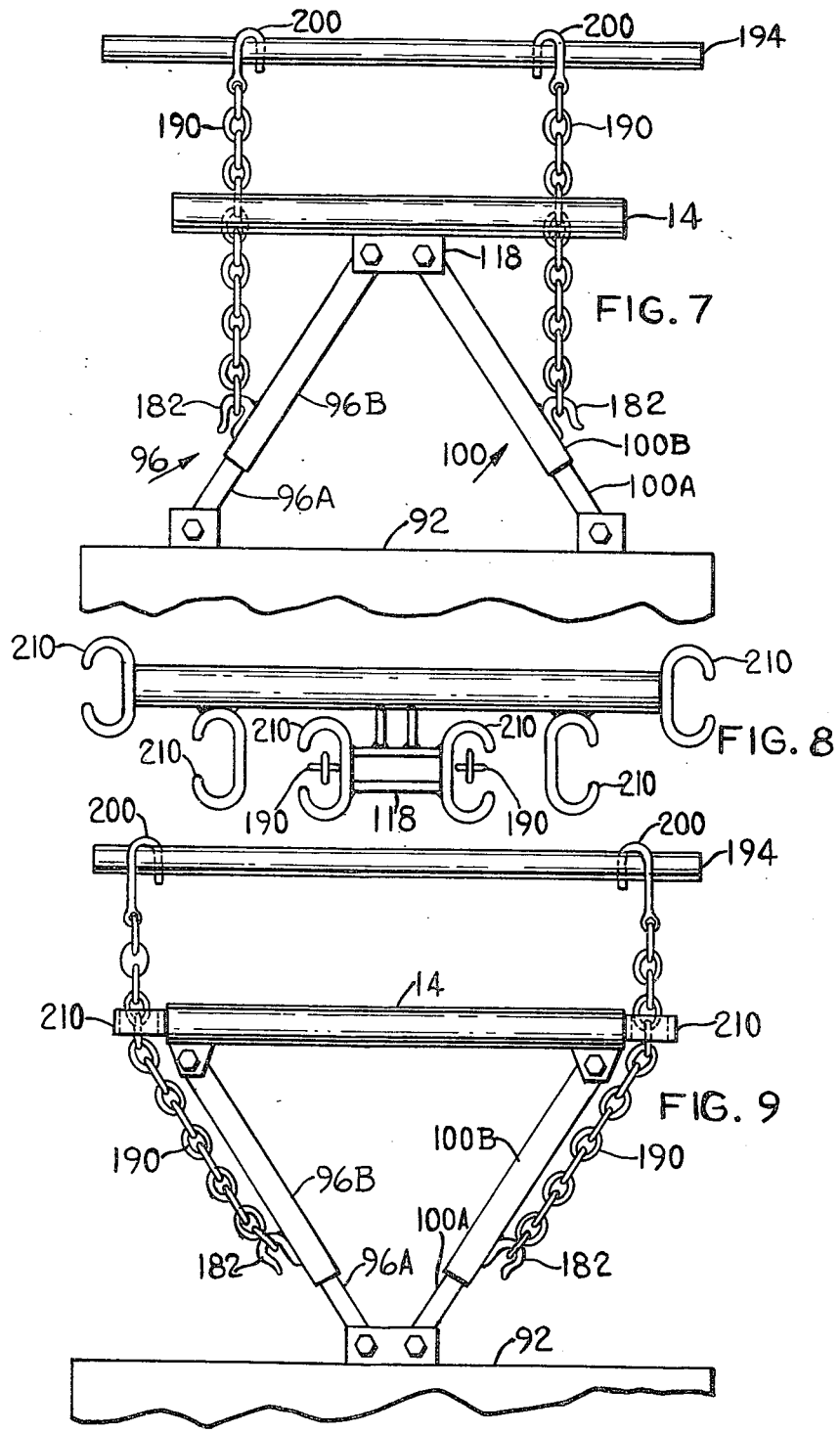

3,504,811
TOWING APPARATUS
Edward F. Wegener and Thure H. Wegener, both of Cranbury-South River Road, Cranbury, N.J. 08512
Continuation-in-part of application Ser. No. 683,410, Nov. 15, 1967, which is a continuation of application Ser. No. 575,920, Aug. 19, 1966, which, in turn, is a continuation of application Ser. No. 399,222, Sept. 25, 1964. This application Apr. 5, 1968, Ser. No. 719,212
Int. Cl. B60d 1/14; B66c 1/22
U.S. Cl. 214—86
8 Claims

ABSTRACT OF THE DISCLOSURE

A vehicle lift and tow bar includes an upper bar and a lower bar, between which extend a pair of flexible slings to cradle the end of a wreck to be towed. A rigid telescoping spacer bar arrangement is coupled between the lower bar and the tow truck, and means are provided for coupling the tow bar to a wreck vehicle by way of cables extending from the telescoping spacer bars along a guide on the lower bar to the undercarriage of the wreck.

---

This application is a continuation-in-part of application Ser. No. 683,410, filed Nov. 15, 1967, now abandoned, which was a continuation of Ser. No. 575,920, filed Aug. 19, 1966, now U.S. Patent No. 3,420,391, which was a continuation of now-abandoned application Ser. No. 399,222, filed Sept. 25, 1964.

In the history of the automobile industry, there have been many developments in the area thereof relating to the handling of disabled vehicles. Initially, relatively simple chain and cable lift apparatus was employed for lifting and towing disabled vehicles, with the primary concern being to accomplish the rescue operation without concern for the "wreck" or the "wrecker" as such. However, as time passed and automobile design advanced, a point was reached at which auto bumper, fender, and grill design became such that a wrecker might cause considerable damage to the vehicle during the rescue operation. To remedy this situation, tow bars have been devised which include flexible slings of fabric, leather, rubber, or the like which contact the disabled vehicle during the towing operation. These slings protect the vehicle during the operation, and, because of the function they must perform, they are necessarily relatively expensive. However, the expense is not of great moment since the slings are ordinarily strong and long-lasting.

However, another problem has arisen and this problem concerns the situation which exists when a vehicle is so damaged that jagged pieces of metal are presented to the tow bar when the tow bar is to be attached to the wreck. In this case, there is no need to protect the vehicle and, in fact, there is need to protect the slings of the tow bar which can be severed or damaged by the jagged metal. With most tow bars, there is no way to protect the flexible sling members, and, in most cases, if there were precautions that could be taken, wrecker operators in general either could not take the time to take these precautions, or they would not bother to do so.

At the present time, wrecker operators must carry two different types of tow bars to properly handle all types of wrecking operations. It is easy to see how cumbersome it is to carry two tow bars and how cumbersome and time-consuming it is to be required to change from one to another at the scene of a wreck.

Accordingly, the principles and objects of the invention concern the provision of an improved tow bar including flexible non-metal sling members having means for protecting a disabled vehicle and, at the same time, having means for protecting the sling members in simple fashion where required.

Briefly, a tow bar embodying the invention is attached to a wrecker and includes both chain means and flexible sling means for attachment to a wreck or disabled vehicle. The chain means and the sling means are so related that, when required, the sling means takes over and provides the required lifting force and vehicle-protecting functions. Similarly, where it is desired to protect the sling means, they may be readily and instantly removed and by-passed by the chain means.

The invention is described in greater detail with reference to the drawings wherein:

FIG. 1 is a perspective view of towing apparatus embodying the invention and a portion of a wreck with which it is used;

FIG. 2 is a perspective view of a portion of the apparatus of FIG. 1 and auxiliary means used therewith;

FIG. 3 shows the apparatus of FIG. 1 illustrating an alternative arrangement for using it with a wreck;

FIG. 7 shows a novel hookup arrangement to a wreck;

FIG. 8 is a front view of a portion of the hookup apparatus of FIG. 7 and auxiliary apparatus for use therewith shown in several possible locations;

FIG. 9 is a plan view of the apparatus shown in FIG. 7 showing a hookup arrangement using auxiliary apparatus shown in FIG. 8;

Figure 4:
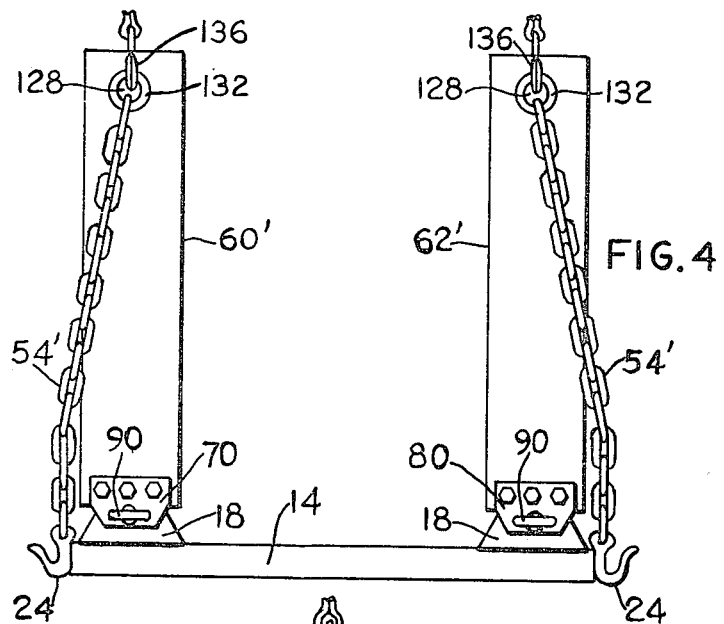
FIG. 4 is a front elevational view of a portion of a modification of the apparatus of FIG. 1.

The principles of the invention are applicable to many of the large number of different types of tow bars which are available commercially. However, the invention will be illustrated and described with respect to only one known type of tow bar.

In its simplest form, a tow bar 10 includes a first metal bar 14 which is adapted to engage a disabled vehicle or wreck 16 to be raised. This bar is known as an anchor bar and, in use, normally lies under and behind the bumper of the wreck. The anchor bar 14 may comprise a flat metal plate, or it may be in the form of a cylinder. The anchor bar is provided with means for attaching flexible sling belts (described below) thereto, and this means comprises either a single elongated flange extending along substantially the entire length of the bar or a pair of spaced apart flanges 18, as shown. The flanges 18 are provided with a plurality of apertures 20 aligned on an axis parallel to the axis of the anchor bar 14. The flanges 18 may be fixed in place on anchor bar 14, or they may be formed as portions of sleeves 19 which are slidably mounted on anchor bar 14 as shown in FIG. 2. This type of construction permits considerable lateral adjustment of the flanges 18 and the apparatus secured thereto.

The anchor bar 14 is also provided at its ends with hooks 24 which are known as grab hooks. A separate chain 28 is adapted to be secured by a link to each grab hook, and the end of each chain 28 is provided with a hook 30 which is adapted to be secured to a convenient portion of the undercarriage of the disabled vehicle 16 during a lifting and towing operation.

The tow bar 10 also includes means for applying a lifting force to the tow bar once it has been attached to the wreck or disabled vehicle 16. In FIG. 1, this means comprises a metal plate or bar 40, which is commonly known in the industry as a lifter bar. The lifter bar 40 is coupled to the anchor bar 14 so that lifting forces applied to the lifter bar may be transmitted to the anchor bar and to the disabled vehicle. The arrangement for coupling the lifter bar to the anchor bar comprises an important feature of the present invention.

In a tow bar 10 embodying the invention, the lifter bar 40 preferably comprises a flat plate as shown, however, it may comprise a cylindrical bar which, like bar 14, is provided with a flange or flanges extending longitudinally along its length. A row of axially aligned apertures 44 is provided along the length of the lifter bar near the edge thereof. The lifter bar is also provided with several relatively large aligned apertures 48, spaced apart along the bar, by which a lifting hook or hooks 50 or the like may be coupled to the tow bar. The hook 50 is coupled to the usual crane on the wrecker vehicle.

The lifter bar 40 and the anchor bar 14 are interconnected, in part, by means of chains or cables 54 connected between corresponding ends of these bars. The chains 54 are either permanently or removably secured to the ends of the bars 14 and 40 in any convenient manner. The chains 54 are of a length suitable to provide a convenient spacing between the anchor bar and the lifter bar.

In addition, according to the invention, the anchor bar 14 and lifter bar 40 are interconnected by a pair of flexible slings 60 and 62 which are adjustably and removably secured thereto. The sling 60 includes upper and lower end flanges 68 and 70, respectively, and sling 62 includes upper and lower end flanges 78 and 80, respectively. The flanges are preferably of metal and are provided with a plurality of aligned apertures 88 which are adapted to be positioned in alignment with selected apertures 20 and 44 in the anchor bar and lifter bar, respectively. A spring-lock push pin 90 or some other easily inserted and easily removed locking means is inserted in the aligned apertures in the flanges and bars to hold the slings in place on the bars 14 and 40. It can be seen that, by selecting the holes 20 and 44 to which the slings 60 and 62 are secured, one may adjust the side-by-side spacing between them to accommodate a wide variety of widths and types of vehicles.

According to the invention, the slings 60 and 62 are of such a length that, when they are secured between the anchor bar 14 and lifter bar 40 for use in lifting a disabled vehicle or wreck, they are shorter than the chains 54 and the anchor bar and lifter bar are so spaced by the slings that the chains hang loosely with some slack between them. Thus, when secured in place, the slings are in contact with the vehicle and apply lifting pressure thereto and the chains are not in lifting contact with the vehicle. The two slings could be replaced by one wide sling 61′ (FIG. 2).

In practicing the present invention, the slings may be made of any suitable flexible material, such as fabric, leather, rubber, metal-reinforced material, or the like.

Coupling means 91 is provided for securing the tow bar 10 to the wrecker 92 to hold the wreck and wrecker spaced apart during the towing operation, and any suitable known means may be employed for this purpose. For purposes of clarity, this means 91 is shown only in FIG. 2. One suitable arrangement includes two telescoping bars 96 and 100, each pivotally secured at one end to the wrecker about a horizontal pin 108. The other ends of the bars 96 and 100 are brought together and are pivotally secured about a vertical pin 112 to a bracket 118 which itself is secured to a sleeve 124 which is rotatably mounted on the anchor bar 14.

In using the tow bar of the invention, the slings 60 and 62 may be normally secured to the lifter bar 40 and anchor bar 14 so that the tow bar is prepared for lifting a vehicle, the front end of which is to be protected. As shown in FIG. 1, with the anchor bar behind the bumper of the wreck, only the slings 60 and 62 contact and cradle the wreck. If the tow bar is to be used to lift a vehicle having a damaged front end so that the slings are to be protected, either the ends thereof secured to the lifter bar may be detached by removing the push pins 90 and allowing the slings to hang freely (FIG. 3), or the slings may be detached completely from both the anchor bar and lifter bar. With this arrangement, the chains 54 contact and cradle the wreck as it is raised.

Figure 5:
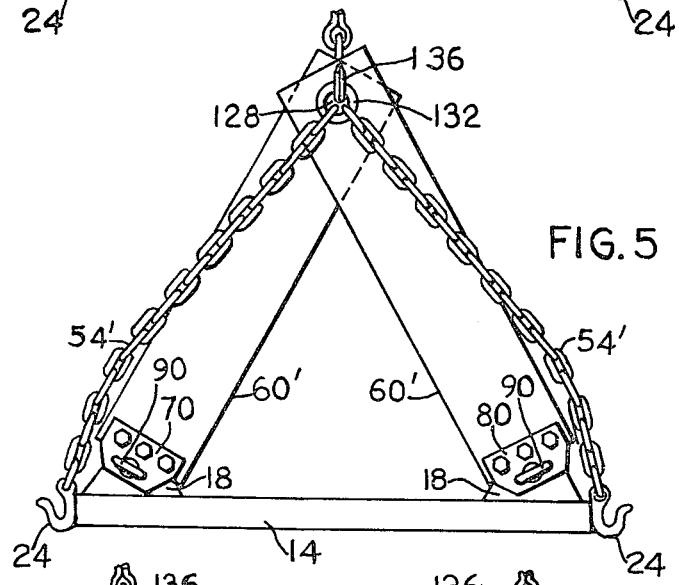
FIG. 5 shows the apparatus of FIG. 4 in one mode of operation.

In a modification of the invention shown in FIGS. 4 and 5, a tow bar 120 includes an anchor bar 14 of the type described above and having the structural features described above, including the flanges 18 for attaching a pair of flexible sling members 60′ and 62′. However, in this embodiment of the invention, the lifter bar is omitted, and the upper ends of the sling members 60′ and 62′ are provided with relatively large apertures 128 in which rugged steel grommets 132 or the like are secured for coupling to a lifting hook 136. In addition, two chains 54′ are provided coupled between the grab hooks 24 and the lifting hook 136. As described above, the slings are shorter than the chains so that when they are in place, they cradle the wreck and the chains do not affect the lifting operation.

In one arrangement for using this embodiment of the invention (FIG. 5), the lower ends of the sling members 60′ and 62′ are secured to the anchor bar 14 at the desired locations, and the upper ends are positioned overlapping each other, with the apertures 128 therein aligned. The lifting hook 136 is inserted in the two aligned apertures in the sling members.

Figure 6:
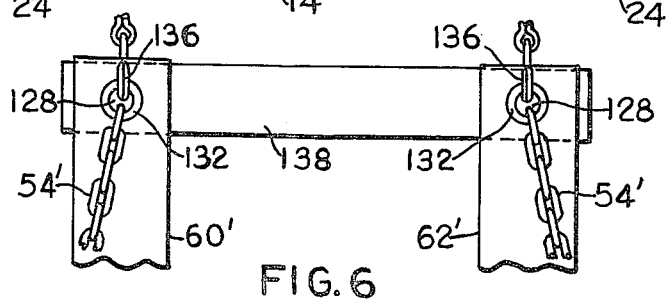
FIG. 6 shows a portion of the apparatus of FIG. 5 in another mode of operation.
Figure 10:
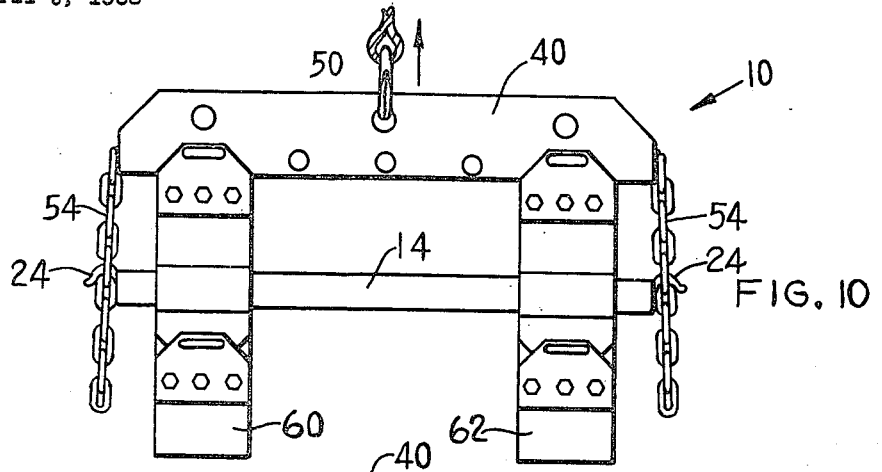
FIGS. 10–13 show the tow bar stowed on the wrecker between jobs.

Alternativly, in using the modification shown in FIG. 4, the sling members 60′ and 62′ may be held apart and each secured to a separate lifting hook 136. If desired, in the latter arrangement for using the invention and referring to FIG. 6, after the hooks 136 have been inserted in the apertures 128 in the slings, a spreader plate 138, which is used as means for holding the sling members spread apart and having suitably large apertures, is threaded over the lifting hooks. In this use of the invention the spreader plate 138 does not perform a lifting function.

The tow bar of the invention has many advantages, one of which is that the slings can be secured to the anchor bar and lifter bar, with the spacing between them adjustable to accommodate vehicles of different size and construction, such as large cars, compact cars, midget cars, and the like. In addition, the slings may be readily attached and removed as the particular towing situation requires. Thus, both the towed vehicle and the tow bar itself can be properly protected as required.

Another advantage of the invention is that the tow bar can be used with chain connections alone between the anchor bar and lifter bar or with flexible slings alone between these two members.

A novel arrangement for coupling tow bar 10 and bars 96 and 100 to a wreck is shown in FIG. 7, with only sufcient detail being displayed to illustrate the principles of the invention. In this arrangement, referring to FIG. 7, if the bars 96 and 100 are telescoping bars, although they need not be to practice the invention, then inner members 96A and 100A are pivotally secured to the tailgate of the wrecker 92, and the outer members 96B and 100B are secured to bracket 118 on the anchor bar 14. In addition, the outer member 96B and 100B of each bar is provided with a grab hook 182 at some convenient location. Grab hooks 24 on anchor bar 14 may be omitted in this embodiment of the invention.

In the novel coupling arrangement of the invention, a cable or chain 190 is coupled taut between the frame 194 of the wreck and each grab hook 182. In this arrangement, the chains 190 preferably lie under the anchor bar 14. Each chain 190 may have a hook 200 at each end, or it may have hook 200 at one end to engage the frame 194 of the wreck, and it may engage the grab hook 182 by a ring (not shown) or by one of its links or in any other suitable fashion.

If desired, guide means may be provided, preferably on the anchor bar, to serve as a guide or retainer for the chains 190 as they extend from the frame 194 of the wreck and the grab hooks 182 on tow bars 96 and 100. This guide means may comprise a pair of C-shaped plates 210, one for each chain 190, through which the chains extend, and these plates may be positioned, for example, at the center of the anchor bar, at the ends of the anchor bar at locations formerly occupied by grab hooks 24, or at any suitable intermediate location, or at all of these locations. The various positions are all shown in FIG. 8.

Of course, in any arrangement of the tow bar of the invention, the bars 96 and 100 may be reversed so that the apex of the V formed by the bars is secured to the tailgate of the wrecker, and the spaced-apart free ends of the bars are secured to the anchor bar 14. This arrangement, which is shown in FIG. 9, is particularly convenient for handling cables 190 when the C-shaped guide members 210 are positioned at the ends of the anchor bar 14.

One advantage of the tow bar construction described above, particularly that shown in FIG. 1, accrues, not in performing a towing operation, but in stowing the tow bar on the wrecker between towing jobs. This aspect of the invention is shown in FIGS. 10 to 13 wherein the showing is rather schematic and only enough detail is shown to illustrate the principles of the invention.

Assuming that a towing job has been completed, then the connecting chains 28, extending between grab hooks 24 on anchor bar 14 and the wreck, are removed and lifting force is applied through the crane of the wrecker to raise the tow bar to a convenient elevated position. The usual position finds the V-bars 96 and 100 almost vertical and bearing against the tailgate of the wrecker. The operator then grasps anchor bar 14 and raises it toward lifter bar 40 so that chains 54 are accessible to grab hooks 24. At this time, the belts 60 and 62 and the chains 54 hang loose and form loops which hang down beneath both bars, and the grab hooks are oriented so that they open downwardly. Now, the operator hooks the grab hooks 24 into the chains 54, so that the lifter bar and anchor bar are held together rather tightly and the tow bar is stowed neatly and compactly and relatively rigidly for travel to and from a wreck.

It can be seen that, in order to achieve this "out-of-use" configuration, the chains 54 must be accessible to the grab hooks on the anchor bar when the anchor bar is raised. Thus, the area of connection of the chains to the lifter bar must be properly selected. The optimum arrangement is one in which the chains extend between the anchor bar and the lifter bar in alignment with, or close to alignment with, the grab hooks and, preferably, both chains and grab hooks are at or near the ends of the anchor and lifter bars outside the slings 60 and 62.

Figure 11:
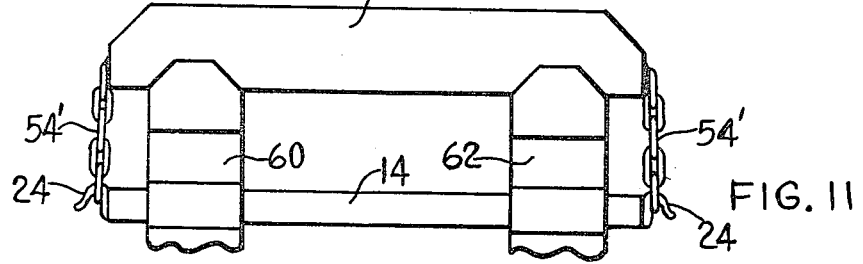
Figure 12:
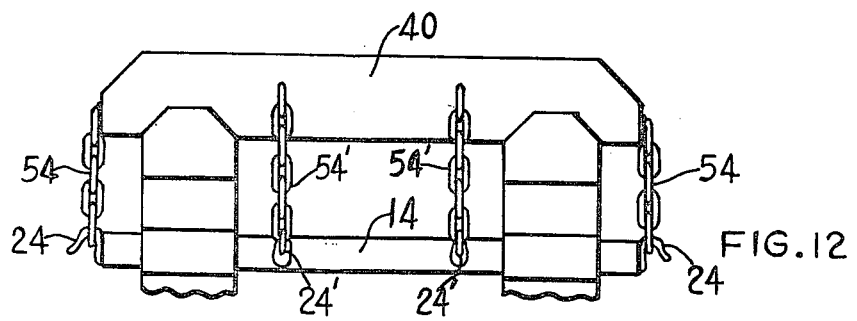
Figure 13:
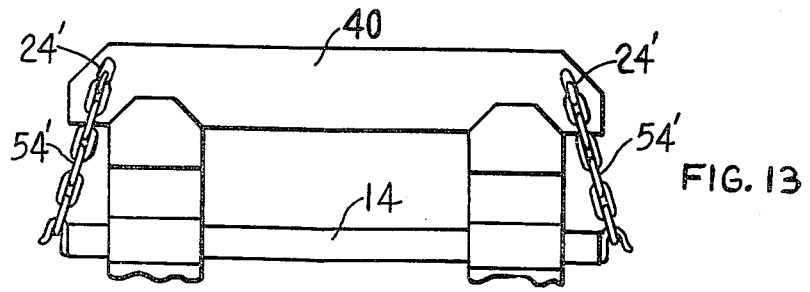

Of course, other arrangements of chains and grab hooks could be employed to achieve the above-described stowage configuration. In FIG. 11, a short auxiliary length of chain 54' is added to the tow bar connected to the ends of the lifter bar 40 and of sufficient length to be accessible to the grab hooks 24 when the anchor bar 14 is raised close to the lifter bar as described above. In addition, as in FIG. 12, full chains 54 or short lengths of chains 54' may be secured to the lifter bar 40 inwardly of its ends to engage grab hooks 24' located at corresponding positions on the anchor bar 14 inwardly of its ends. In FIG. 12, if the inward chains 54' could not perform the above-described wreck-cradling function, then the tow bar would also include chains 54 and grab hooks 24 at the ends of the bars 14 and 40 for this purpose. In another arrangement shown in FIG. 13, grab hooks 24' might be placed on the lifter bar 40 as shown in FIG. 1 or at some other location than at the ends of the lifter bar to engage short lengths of chain 54' connected to the anchor bar 14 or to engage full chains 54 connected between the anchor and lifter bars. However, this is not as convenient to manipulate as the arrangements described above where the chains are secured to the lifter bar and the grab hooks are located on the anchor bar and can be turned to face downwardly.

What is claimed is:

1. Vehicle lifting and towing apparatus including
an upper bar and a lower bar adapted to be spaced apart in front of an end of a wreck vehicle to be raised with said lower bar adapted to be positioned beneath the bumper of said vehicle and said upper bar positioned generally vertically above said first bar and adapted to be out of contact with said vehicle,
a pair of flexible slings having coupling means at their ends by which they are connected to said upper and lower bars generally parallel to each other, and means for adjusting said slings relative to each other on said upper and lower bars,
a pair of chains also coupled between said upper bar and said lower bar as auxiliary members for cradling a vehicle,
chain guide means on said lower bar,
a pair of rigid wreck-to-wrecker spacer bars secured at one end to said lower bar and adapted to be secured at their other ends to a towing vehicle, and
a hook on each of said rigid bars for coupling a chain taut between said bars and a wreck vehicle by way of said guide means with a portion of the wreck vehicle resting on said slings or chains adjacent to said lower bar.

2. Vehicle lifting and towing apparatus including
an upper bar and a lower bar adapted to be spaced apart in front of an end of a wreck vehicle to be raised with said lower bar adapted to be positioned beneath the bumper of said vehicle and said upper bar positioned generally vertically above said first bar and adapted to be out of contact with said vehicle,
a pair of flexible slings having coupling means at their ends by which they are connected to said upper and lower bars generally parallel to each other, said couplings being removable from at least one of said bars, and means on said bars for laterally adjusting the spacing between said slings,
a pair of chains also coupled between said upper bar and said lower bar, said chains being adapted to cradle a vehicle instead of said slings as required,
a pair of rigid wreck-to-wrecker spacer bars secured at one end to said lower bar and adapted to be secured at their other ends to a towing vehicle, and
coupling means on said rigid bars for coupling flexible connector means taut between said bars and a wreck vehicle with a portion of the wreck vehicle resting on said slings or said chains adjacent to said lower bar.

3. The apparatus defined in claim 2 wherein said coupling means comprises at least two grab hooks secured to said rigid spacer means and said flexible connector means comprises chains or cables.

4. The apparatus defined in claim 2 and including guide means on said vehicle contacting means for guiding said flexible connector means from said coupling means to the wreck.

5. The apparatus defined in claim 2 wherein said guide means comprises a pair of C-shaped metal brackets.

6. The apparatus defined in claim 2 wherein
said coupling means comprises two grab hooks, one on each rigid spacer bar,
said flexible connector means comprises a pair of chains, and
said guide means comprises a pair of generally C-shaped guide members spaced apart on said lower bar and each adapted to guide one of said chains from one of said grab hooks through a C-shaped guide to the wreck vehicle.

7. Vehicle lifting and towing apparatus including
an upper bar and a lower bar adapted to be spaced apart in front of an end of a wreck vehicle to be raised with said lower bar adapted to be positioned beneath the bumper of said vehicle and said upper bar positioned generally vertically above said first bar and adapted to be out of contact with said vehicle, a pair of flexible slings having coupling means at their ends by which they are connected to said upper and lower bars generally parallel to each other, said couplings being removable from at least one of said bars and laterally adjustable on both bars to permit adjustment of the side-by-side spacing between said slings, a pair of chains coupled between said upper bar and said lower bar, said chains being longer than said slings so that when said slings are secured between said bars, said slings cradle a vehicle and said chains hang loose and cannot contact said vehicle, a pair of rigid wreck-to-wrecker spacer bars secured at one end to said lower bar and adapted to be secured at their other ends to a towing vehicle, and coupling means on said rigid bars for coupling flexible connector means taut between said bars and a wreck vehicle with a portion of the wreck vehicle resting on said slings adjacent to said lower bar.

8. The apparatus defined in claim 7 wherein said coupling means comprises a grab hook on each rigid bar and further including guide means on said lower bar for guiding said flexible connector means between said grab hooks and said wreck.

References Cited

UNITED STATES PATENTS 2,913,131  11/1959  Holmes.
3,310,186  3/1967  Wegener et al.

ALBERT J. MAKAY, Primary Examiner

U.S. Cl. X.R.

280—480